April 15, 1958 W. F. VAN AMBURG 2,830,349
QUICK RELEASABLE CONNECTING DEVICE
Filed Jan. 19, 1954 2 Sheets-Sheet 2
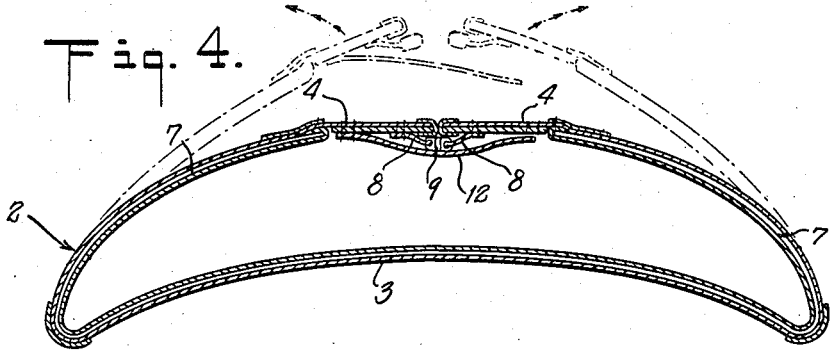
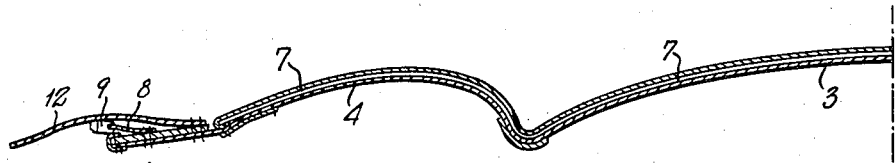
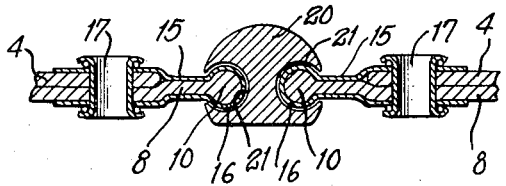
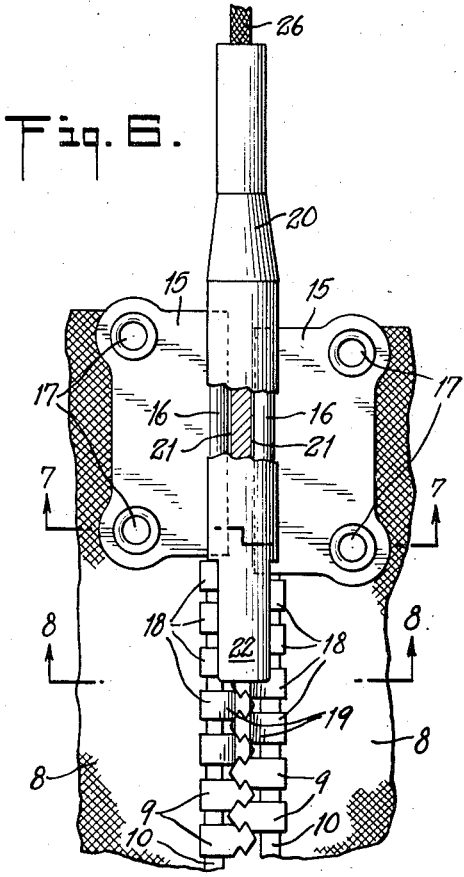
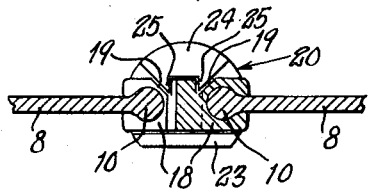
INVENTOR.
WILLIAM F. VAN AMBURG
BY R. E. Meech
ATTORNEY.

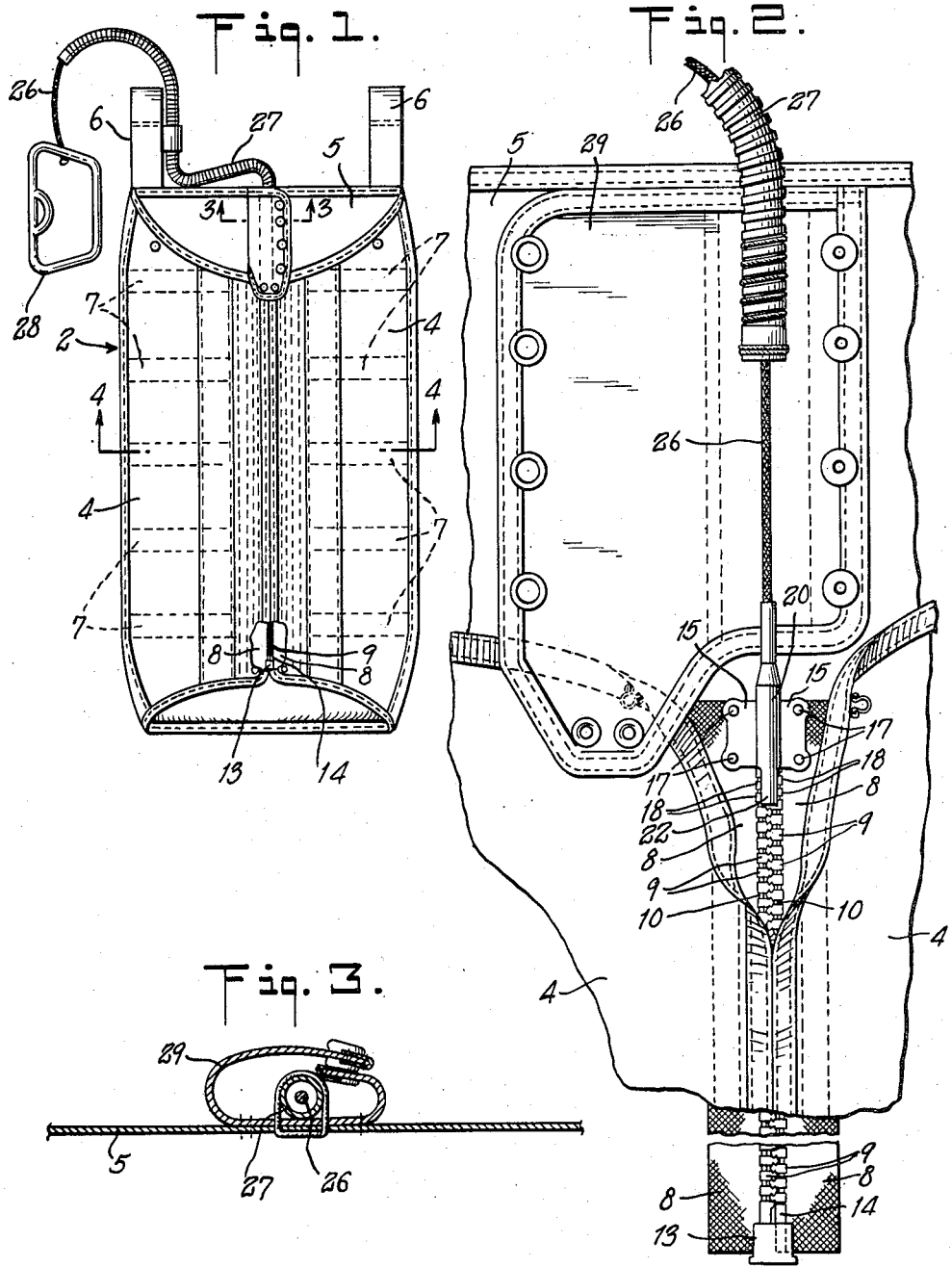

_United States Patent Office_

2,830,349
Patented Apr. 15, 1958

2,830,349

QUICK RELEASABLE CONNECTING DEVICE

William F. Van Amburg, Meadville, Pa., assignor to Talon, Inc., a corporation of Pennsylvania Application January 19, 1954, Serial No. 404,914

4 Claims. (Cl. 24—205.11)

This invention relates to a quick releasable connecting device which is particularly adaptable for use with parachute packs or harnesses.

It is the general object of the present invention to provide an improved quick releasable device for slide fasteners which will permit the fastener elements of the fastener to become automatically disengaged when manipulated.

It is another object of the invention to provide an improved quick releasable device for slide fasteners which is simple and inexpensive in its construction and at the same time effective and efficient in its use.

It is a further object of this invention to provide a quick releasable connecting device which may be easily incorporated with parachute packs of various types and which is certain in its operation and practically incapable of jamming or sticking when operated.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

Fig. 1 a plan view, partly broken away, of a parachute pack with which the present invention is incorporated;

Fig. 2 is a fragmentary view of the upper portion of the pack showing the quick releasable device of my invention;

Fig. 3 is a sectional view taken on line 3—3 of Fig. 1;

Fig. 4 is a sectional view taken on line 4—4 of Fig. 1;

Fig. 5 is a cross-sectional view similar to Fig. 4 through a portion of the pack showing one of the flaps in open position, Fig. 6 is a plan view partly broken away, of the upper portion of the fastener showing the retaining pin member of my quick releasable device in position on the end of the fastener;

Fig. 7 is a sectional view taken on line 7—7 of Fig. 6 and

Fig. 8 is a sectional view taken on line 8—8 of Fig. 6.

The present invention for the purpose of illustration, is shown incorporated with a parachute pack which may be of any conventional or preferred style or design made of any suitable fabric or other material consisting of an elongated body portion 2 and a back or rear portion 3 having flexible marginal flaps 4 arranged to either side thereof and an upper end flap 5. It will be understood that additional flaps may be provided as desired and any other suitable type of pack enclosing means may be used. The pack is provided with risers 6 at the upper end thereof which are attached to the harness and extend over the shoulders of the wearer.

There is arranged with the body portion 2 and the flaps 4, resilient or spring means for opening or spreading the flaps so as to permit the canopy (not shown) to escape from the pack. Such resilient means in the present instance, consists of a plurality of spring strips or spreader members 7, preferably made of relatively thin spring steel and which are disposed across the rear portion 3 and extend to the marginal edges of each of the flaps 4. These spreader members 7 are spaced apart and are connected to one another so that the pack is extremely flexible and conforms to the back of the wearer and does not interfere materially with his movements.

According to the present invention, there is provided a slide fastener for closing the flaps 4 of the pack against the action of the spreader members 7 so as to house the canopy and retain it therein until it is desired that it be expelled therefrom. Such a fastener consists generally of a pair of stringer tapes 8 having a series of interlocking fastener elements 9 attached to their opposed beaded edges 10. These stringer tapes 8 are sewn or otherwise attached to the opposed marginal edges of the flaps 4. There is provided a flap portion 12 on the inner side of the fastener for shielding the fastener from the canopy so that the canopy will not become damaged or caught in the fastener.

On the lower end of the fastener, there is provided a conventional separable end connection which consists of a socket or a retainer member 13 securely attached to the beaded edge 10 of one of the stringer tapes 8 at a point immediately below the endmost fastener element 9 of that stringer and a pin member 14 attached to the beaded edge of the other stringer at a point immediately below the endmost fastener element of that stringer. It will be understood that this separable end connection is so constructed and arranged that the pin 14 will automatically become disengaged from the retainer 13 when the interlocking fastener elements 9 are completely disengaged and the fastener open as a result of any lateral forces or tearing action to which the stringers are subjected.

At the upper end of the fastener, there is arranged the quick releasable connecting device in accordance with the present invention. On the upper ends of each of the stringers 8 just beyond the endmost fastener elements 18 thereof, there is arranged a plate-like member 15 which consists preferably of a piece of sheet metal folded around the beaded edge 10 thereof, so as to provide opposed tubular pin-like portions 16 at the upper ends of the stringers, as shown more clearly in Figure 7. Each of these plate-like members 15 extend over the stringer tapes 8 and are attached thereto and to the marginal edge portions of the flaps 4 preferably by means of a pair of grommets or rivets 17.

In the series of the endmost fastener elements 18 on both of the stringers 8 positioned immediately below the plate-like members 15, and as more clearly shown in Figures 6 and 8, there is arranged on one side of these elements a substantially V-shaped notch 19 positioned immediately inwardly of the head portions of the respective fastener elements with the V-shaped notches in the fastener elements on their respective stringers being in longitudinal alignment with one another. These V-shaped notches are provided for a purpose presently to be described.

There is provided an elongated detachable retaining member 20 in the form of a pin with a pair of opposed circular-shaped slots 21 arranged in the opposed sides thereof intermediate its length as more clearly shown in Figure 7. The outer end portion is forked or bifurcated, as at 22, with the slots 21 communicating with this forked or bifurcated end portion so as to provide spaced apart portions 23, and 24. The inner face of the portion 23 is flat and smooth and there is arranged on the inner face of the opposed portion 24, a pair of spaced apart longitudinally extending V-shaped ribs or projecting portions 25 which are adapted to cooperate with the V-shaped notches 19 in the fastener elements 18 for a purpose and in a manner hereinafter to be described.

At the inner end of the retainer member 20 there is securely attached thereto, a ripcord 26 in the form of a flexible cable. This ripcord or cable 26 extends freely through a flexible housing 27 so that it may be moved longitudinally in respect to the housing and to the free end of the ripcord at the outer end of the housing there is attached thereto a ripcord handle 28 for manipulating the same in a well known manner. The inner end of the housing 27 and the ripcord 26 are securely positioned in a sheath or casing 29 secured to the upper end flap 5 as more clearly shown in Figures 2 and 3, so as to protect the inner end of the ripcord and the retaining member 20 and eliminate any possible interference with the function and action thereof.

Having described the construction of my improved quick releasable connecting device, it functions in the following manner.

The canopy (not shown) is folded and packed in the container or pack in the usual manner. The marginal flaps 4 are then folded over the canopy against the action of the spreader members 7 so that the marginal edges of the flaps are disposed directly opposite one another. A conventional slider (not shown) has been previously disposed on the stringer of the slide fastener on which the retainer 13 is disposed. The pin member 14 of the separable end connection is then threaded through the slider into engagement with the socket or retainer 13 in the usual manner so as to engage the fastener stringers at the lower end of the fasteners. The slider is then moved upwardly along the fastener elements 9 so as to interengage the fastener elements 9 of each of the stringers in the usual manner. When the slider reaches the upper end of the fastener, it is moved off the ends of the stringers and out of engagement therewith and discarded or retained for future use.

The tubular pin-like portions 16 together with the fastener elements positioned therebelow are manually held together after the slider has been removed and the elongated retaining pin member 20 is then positioned on the upper end of the fastener by threading the tubular pin-like edge portions 16 of the respective plate-like member 15 into the opposed respective circular slots 21 in the opposed sides of this retaining member 20, as shown in Figures 6 and 7. In moving the retaining member to such position the forked or bifurcated end portion 22 of this retaining member will straddle the series of endmost fastener elements 18 with the portion 23 disposed on the inner side of the fastener elements and the portion 24 disposed on the outer side thereof, as shown in Figure 8 of the drawings. In such position, it will be seen that the V-shaped projections or ribs 25 will be disposed in the corresponding V-shaped notches 19 in the series of endmost fastener elements 18. By providing such an arrangement it will be seen that this retaining member 20 securely holds the upper end of the fastener together and the endmost fastener elements 18 in interlocked relation.

When the pack is to be opened, it will be understood that the ripcord 26 will be drawn through the housing 27 when the ripcord is pulled by the handle 28. In so doing, it will be seen that the elongated retaining member 20 will be moved longitudinally out of engagement with the series of endmost fastener elements 18 and the tubular portions 16 of the plate-like members 15 thereby permitting the fastener to become disengaged.

When this retaining member 20 has been moved out of engagement with the end of the fastener stringers, it will be understood that the fastener will become completely disengaged along the marginal edges of the flaps due to the lateral forces applied thereto by the action of the spreader members 7 thereby opening the flaps 4 and permitting the canopy to escape from the pack or container, as shown in the broken lines of Figure 4 of the drawings.

While I have shown my improved quick releasable connecting device incorporated with a parachute pack, it will be understood that this is merely for the purpose of illustration and that it can be employed wherever a slide fastener is used and when a quick releasable arrangement of such a fastener is desired.

As a result of my invention, it will be seen that there is provided a quick releasable connecting device which is efficient and effective in its use and one which is practically foolproof. It will also be seen that this connecting device may be easily incorporated with existing parachute packs without any material changes.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. In a quick releasable connecting device, the combination of a slide fastener comprising a pair of fastener stringers having a series of spaced apart interlocking fastener elements arranged along their opposed edges, a separable end connection secured to the stringers at one end thereof, detachable connection means arranged at the other end of said stringers for maintaining said stringers in interlocked relation, said detachable means comprising a pair of elongated pin-like members attached to the edges of said stringers adjacent the endmost fastener elements thereof, an elongated detachable retaining member having a longitudinally extending rib-like portion with a longitudinally extending slot arranged to either side thereof for receiving and engaging said pin-like members and for maintaining said stringers in interlocked relation, a forked portion arranged on the inner end of said retaining member for engaging a series of endmost fastener elements positioned therebelow, said forked portion having a pair of longitudinally extending rib-like portions arranged on the inner side thereof engaging aligned grooves arranged in the series of endmost fastener elements, and means for manipulating said retaining member whereby it is adapted to be moved out of engagement with said pin-like members so as to permit the stringers to become automatically disengaged when lateral forces are applied to said stringers.

2. In a quick releasable connecting device, the combination of a slide fastener comprising a pair of fastener stringers having a series of spaced apart interlocking fastener elements arranged along their opposed edges, a separable end connection secured to the stringers at one end thereof, detachable connection means arranged at the other end of said stringers for maintaining said stringers in interlocked relation, said detachable means including an elongated detachable retaining member having a slot arranged in the end thereof which engages with the endmost fastener elements at that end of the stringers for maintaining them in interlocked relation, a forked portion arranged on the inner end of said retaining member for engaging a series of endmost fastener elements positioned therebelow, said forked portion having a pair of longitudinally extending rib-like portions arranged on the inner side thereof engaging aligned grooves arranged in the series of endmost fastener elements, and means for manipulating said retaining member whereby it is adapted to be moved out of engagement with the endmost fastener elements so as to permit the stringers to become automatically disengaged when lateral forces are applied to said stringers.

3. In a quick releasable connecting device, the combination of a slide fastener comprising a pair of fastener stringers having a series of spaced apart interlocking fastener elements arranged along their opposed edges, a separable end connection secured to the stringers at one end thereof, detachable connection means arranged at the other end of said stringers for maintaining said stringers in interlocked relation, said detachable means including a pair of elongated pin-like members attached to the edges of said stringers adjacent the endmost fastener elements thereof and an elongated detachable retaining member having a longitudinally extending rib-like portion with a longitudinally extending slot arranged to either side thereof for receiving and engaging said pin-like members and a series of the endmost fastener elements positioned adjacent thereto for maintaining the stringers in interlocked relation, a forked portion arranged on the inner end of said retaining member for engaging a series of endmost fastener elements positioned therebelow, said forked portion having a pair of longitudinally extending rib-like portions arranged on the inner side thereof engaging aligned grooves arranged in the series of endmost fastener elements, and means for manipulating said retaining member whereby said member is adapted to be moved out of engagement with said pin-like members and the endmost fastener elements so as to permit the stringers to become automatically disengaged when lateral forces are applied to said stringers.

4. In a quick releasable connecting device, the combination of a slide fastener comprising a pair of fastener stringers having a series of spaced apart interlocking fastener elements arranged along their opposed edges, a separable end connection secured to the stringers at one end thereof detachable connection means arranged at the other end of said stringers for maintaining said stringers in interlocked relation, said detachable means including a pair of plate-like members with one attached to the end of each of the stringers adjacent the endmost fastener elements thereof, said plate-like members having opposed tubular portions arranged around and along the opposed edges of said stringers, an elongated detachable retaining member having a longitudinaly extending rib-like portion with a longitudinally extending slot arranged to either side thereof for receiving and engaging the tubular portions of said plate-like members and for maintaining said stringers in interlocked relation, a forked portion arranged on the inner end of said retaining member engaging the endmost fastener elements adjacent said tubular portions, said forked portion having a pair of longitudinally extending rib-like portions arranged on the inner side thereof engaging aligned grooves arranged in the series of endmost fastener elements, and means arranged on the outer end of said retaining member for manipulating the same, said retaining member adapted to be moved longitudinally of said fastener and out of engagement with said tubular portion and said endmost fastener elements by said manipulating means so as to permit the stringers to become automatically disengaged when lateral forces are applied to said stringers.

References Cited in the file of this patent

UNITED STATES PATENTS

| 2,180,167 | Pruzan | Nov. 14, 1939 |
| 2,384,651 | Smith | Sept. 11, 1945 |
| 2,683,910 | Moran | July 20, 1954 |
| 2,729,410 | Moran | Jan. 3, 1056 |

FOREIGN PATENTS

| 548,281 | Great Britain | Dec. 16, 1936 |